UNITED STATES PATENT OFFICE.

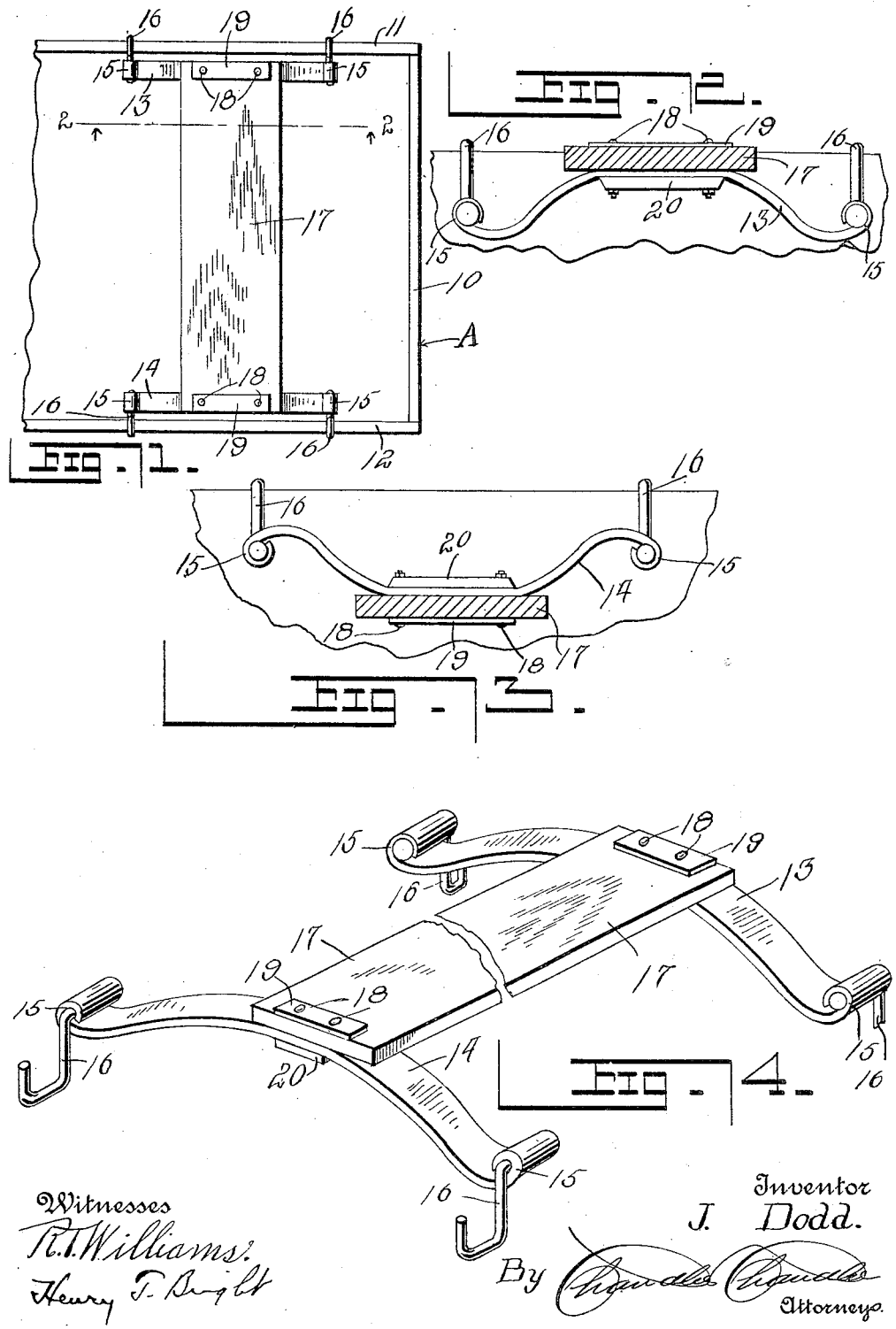

JOHN DODD, OF WAWOTA, SASKATCHEWAN, CANADA.

VEHICLE-SEAT.

1,131,487. Specification of Letters Patent. Patented Mar. 9, 1915.

Application filed March 3, 1913. Serial No. 751,815.

*To all whom it may concern:*

Be it known that I, JOHN DODD, a subject of the King of England, residing at Wawota, in the Province of Saskatchewan, Dominion of Canada, have invented certain new and useful Improvements in Vehicle-Seats; and I do hereby declare the following to be a full, clear, and exact description of the invention, such as will enable others skilled in the art to which it appertains to make and use the same.

This invention relates to vehicle seats.

The object of the invention resides in the provision of a vehicle seat which may be supported from the wagon box in different elevations to the latter, said seat being adapted to be supported in its greatest elevation when the wagon is loaded and at its lowest elevation when the wagon is empty, the last position of the seat enabling the driver to protect himself from the weather as a result of the shielding effect of the wagon box.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a plan view of the forward portion of a wagon box showing the improved seat applied and disposed in elevated position; Fig. 2, a section on the line 2—2 of Fig. 1. Fig. 3, a view similar to Fig. 2 looking in the opposite direction and with the seat lowered, and Fig. 4, a detail perspective view of the seat detached.

Referring to the drawings A indicates a wagon box which includes a front member 10 and side members 11 and 12.

The improved seat is shown as comprising a pair of parallel spaced bow springs 13 and 14, the terminals of each of which are rolled as at 15 and have pivotally mounted in this roll portion a hook 16. The central portions of the springs 13 and 14 are connected by a seat element 17, said seat being secured to the springs by means of bolts 18 which pass through the seat and springs and also through a wear plate 19 and a wear block 20 disposed respectively on the upper side of the seat and on the under side of each spring.

In applying the seat to the wagon box in its greatest elevation the hooks 16 are engaged over the upper edges of the sides 11 and 12 with the bow of said springs directed upwardly as shown in Fig. 2. If it is desired to secure the seat to the wagon box in its lowest elevation it is only necessary to disengage the hooks 16 from the wagon box and reverse the position of the springs 13 and 14 so that the bow thereof will be disposed downwardly. With the parts in this position the hooks 16 are again engaged with the side members 11 and 12 and the seat 17 will then be supported a considerable distance inwardly of the upper edge of the wagon box as shown in Fig. 2.

What I claim is:—

A seat for reversible suspension from the sides of a wagon box consisting of a pair of spaced bow springs, a seat element connecting said springs at their central portions and having its long axis disposed at right angles to the long axes of the springs, and hooks pivoted to the ends of said springs respectively for movement in a plane parallel to the long axes of the springs, said hooks being adapted for removable engagement over the sides of the wagon box whereby the springs may be supported from the wagon box with the seat element disposed either above and below the springs.

In testimony whereof, I affix my signature, in the presence of two witnesses.

JOHN DODD.

Witnesses:
B. McDOUGALL,
C. N. SYME.

Copies of this patent may be obtained for five cents each, by addressing the "Commissioner of Patents, Washington, D. C."